Dec. 21, 1965 M. A. M. BAKKER ETAL 3,225,273

SEMI-CONDUCTOR DEVICES AND METHODS FOR THEIR MANUFACTURE

Filed May 5, 1961

INVENTOR
MARTINUS A.M. BAKKER.
AALBERT VAN VULPEN.
BY
Frank R. Trifari
AGENT

United States Patent Office 3,225,273
Patented Dec. 21, 1965

3,225,273

SEMI-CONDUCTOR DEVICES AND METHODS FOR THEIR MANUFACTURE

Martinus Antonius Maria Bakker and Aalbert Van Vulpen, Emmasingel, Eindhoven, Netherlands, assignors to North American Philips Company, Inc., New York, N.Y., a corporation of Delaware Filed May 5, 1961, Ser. No. 108,099
Claims priority, application Netherlands, May 13, 1960, 251,613
10 Claims. (Cl. 317—237)

This invention relates to semi-conductor devices, and in particular to photo-sensitive devices comprising a semi-conductive or photo-conductive body portion of an n-type chalcogenide of a bivalent metal to which one or more ohmic electrodes are provided. The invention also relates to methods of forming an ohmic electrode connection to an n-type chalcogenide of a bivalent metal.

The semi-conductive compounds envisaged under the name "chalcogenides" include in the usual manner the sulphides, selenides, tellurides or their mixed-crystals that may be used in semi-conductor devices such as, for example, in semi-conductor diodes. The chalcogenides of the bivalent metals are especially important for use in photo-sensitive devices, such as in photo-resistors, or in the photo-conductive portion of a solid-state image intensifier, in which the electrical impedance between a number of electrodes is controlled by the incident radiation. Cadmium sulphide, cadmium telluride and cadmium solenide are important examples of materials in this group. In these applications, it is usually desired to provide at least one ohmic electrode on the semi-conductive body. This may be accomplished by evaporation, electrolytical deposition or melting of a suitable contact material onto the body. Thus, for example, it is common practice to provide ohmic electrodes on such n-type bodies by evaporating thereon precious metals, such as gold or silver. It is also known that ohmic electrodes may be made on an n-type chalcogenide by providing indium thereon. However, it has been found that the ohmic behaviour of such precious metal contacts, especially of gold contacts, is unsatisfactory and that the transition resistance of these contacts is comparatively high, so that a series-resistance, detrimental to operation, is introduced in the current path. Further, indium electrodes have the disadvantage that the indium migrates along the surface in the presence of a high field strength in its vicinity. This is troublesome especially for uses where the distance between such indium electrode and an adjacent electrode determines the electrical properties of the device, since the migration of the indium has the effect of varying said properties during operation, and even can result in short-circuits between the electrodes after operation for a long duration.

The principal object of the invention is to provide an improved ohmic electrode to an n-type chalcogenide in which the above-mentioned disadvantages are obviated or at least mitigated. The invention also provides an extremely suitable and efficacious method of providing such an ohmic electrode on such a semi-conductive body.

According to the invention, the ohmic electrode comprises gold or silver or alloys thereof activated with one or more of the elements indium, gallium and aluminum. It has surprisingly been found that the presence of even a comparatively small concentration of one or more of indium, gallium or aluminum ensures satisfactory ohmic contact behaviour, whereas the elements silver or gold precludes, probably due to binding in the form of an alloy, spread or migration of the latter in an electric field. To obtain satisfactory binding, the content of the elements indium, gallium or aluminum is chosen preferably not larger than 30 at. percent. Particularly satisfactory resulted are obtained with a content of one or more of these elements between about 1 and 15 at. percent. An electrode of gold activated with indium is preferred both from the electrical and manufacturing standpoints.

In one particularly advantageous embodiment of a semi-conductor device according to the invention, the electrode is non-homogeneous in a direction perpendicular to the junction between the electrode and the n-type chalcogenide. Specifically, the electrode layer adjoining the semi-conductor comprises substantially one or more of the elements indium, gallium or aluminum, and the gold or silver content increases in a direction away from the body. The preferred concentrations recited above are, in such a case, with respect to the whole electrode. Due to this non-homogeneous structure, very suitable electrodes having a low ohmic transition-resistance and a high stability are obtained. The electrodes may be provided in various ways by utilizing techniques commonly employed for providing such elements, such as evaporation, cathode atomisation, electrolytic deposition, melting, etc. The evaporating method has been found to be particularly suitable for an electrode of gold activated with indium. In the evaporating process, use may be made of an alloy of an element from one group with an element from the other group in the desired composition. According to a further aspect of the inventive method, the initial material used in the evaporating process preferably consists of an non-homogeneous body, for example a wire, the interior of which, for example the core, is substantially of gold or silver and the outer part or cladding of which consists substantially of one or more of the activating elements, preferably of indium. This method enables in a simple and efficacious manner, the obtention of electrodes of the desired composition since a thin layer consisting substantially of the activator is first deposited on the semi-conductor followed by the precious metal. Electrodes of this non-homogeneous composition may also be provided in a simple manner by cathode atomisation (sputtering) with the use of an initial body of the desired non-homogeneous composition.

In order that the invention may be readily carried into effect several embodiments will now be described in detail, by way of example, with reference to the accompanying drawing, in which.

Figure 1:
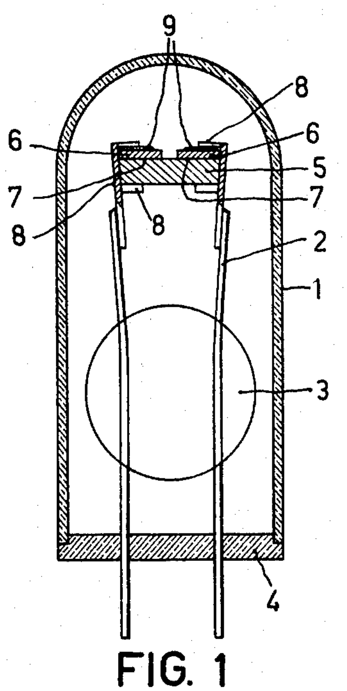
FIG. 1 shows a longitudinal sectional view of a photo-electric cell according to the invention.

The photo-electric cell shown in FIG. 1 comprises a glass envelope 1 containing a photo-conductive body 5 of high-ohmic n-type CdS, which is supported on support wires 2 which also serve as current leads and extend to the exterior through a glass bead 3 and a base 4 of the envelope 1. Provided on the photo-conductive body 5, with a small spacing, for example of 0.25 mm., are two ohmic electrodes or contacts in the form of thin layers 6, which consist of gold or silver activated with one or more of indium, gallium and aluminum, for example, an evaporated gold-indium alloy having an indium content of about 9 at. percent.

Figure 3:
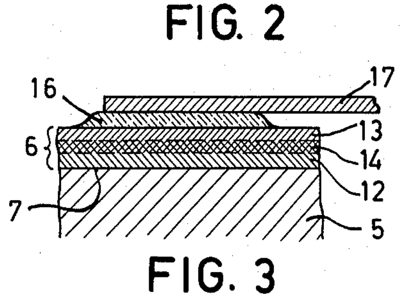
FIG. 3 is a detail view of a modification.

Instead of a homogeneous gold-indium alloy, a non-homogeneous distribution is preferably used in the electrodes 6 in order further to improve the ohmic contact action and decrease the transition resistance. In this case, which is illustrated in FIG. 3, the electrodes 6 consist substantially of indium in a layer portion 12 directly adjoining a junction surface 7 of the body 5 and merging at the upper surface into gold 13 in a direction at right angles to the junction surface 7, for example via a gold-indium alloy 14. In this case the indium layer is preferably not made too thick to insure satisfactory binding thereof. The use of an electrode composition according to the invention enables the obtention of an extremely low ohmic transition resistance while avoiding the spread or migration of the activating element, that is to say, of indium, which is very important for photo-conductive devices in which a very high voltage and field strength between the electrodes is employed to obtain a high sensitivity. When the outer surface is of gold, the additional advantage is derived of its excellent resistance to tarnishing which preserves its functioning as a low-resistance connection.

Figure 2:
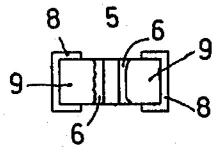
FIG. 2 is a plan view of the photo-conductive body used in the photo-electric cell of FIG. 1.

The block-shaped photo-sensitive body 5 with its ohmic electrodes 6 is fixed at its ends in angular or cup-shaped plates 8, for example of nickel, which are welded to the support wires 2 and also connected in a conductive manner to the associated electrode layers through a paste 9 of high thermal and electrical conductivity, for example silver paste. FIG. 2 is a plan view of the photo-sensitive body 5 with its electrode layers 6 from which the securement in the angular plates 8 can be seen. If desired, as shown in FIG. 3, a conductive lead 17 may be soft-soldered with conventional solders 16 to the outer gold surface 13.

An example of a preferred evaporating process is as follows: The initial material employed is an approximately 7 cms. long gold wire of about 0.5 mm. in diameter, which is covered homogeneously by electrodeposition with a thin indium layer forming about 5% by weight of the available gold. This wire is wound round a tungsten filament and the whole is subsequently placed in a bell jar or evacuable chamber which also contains CdS strips of about 3 x 30 x 1 $mm.^3$ which are to be coated by evaporation. These strips are placed in a holder so that only one side is exposed to evaporation, and to obtain the desired interelectrode space, a masking wire about 0.25 mm. wide is provided at the center of each strip in its longitudinal direction. After the chamber has been exhausted, the filament is slowly heated to the temperature at which the indium-clad gold wire evaporates, the heating process being continued until the initial material has been evaporated almost completely. The CdS-strips are thus first covered by vapor deposition with a thin layer consisting substantially of indium from the cladding, which then merges via a gold-indium alloy when the core is reached, into an outer layer consisting substantially of gold when the cladding has been exhausted. After this treatment the CdS-strips are homogeneously covered on one side with the electrode material except for a path of about 0.25 mm. extending in the longitudinal direction of the strips. A plurality of block-shaped CdS photo-resistant bodies of a shape as shown in FIGURES 1 and 2 may now be manufactured from each strip by sawing or slicing it at right angles to its longitudinal direction. Finally, each block 5 is assembled into the terminals 8 within the envelope 1, and the latter sealed off. The resistance exhibited by the CdS between the ohmic contacts 6 is a function of the incident light or radiation. High voltages are impressed across the contacts 6 to increase the sensitivity of the device.

Instead of the above described non-homogeneous initial material, it is also possible to use a homogeneous alloy such as a gold-indium alloy of the desired composition, which upon heating will have at first still an indium rich vapor. However, since such homogeneous alloys are comparatively brittle, they cannot be worked up into wire or only with great difficulty, so that upon evaporation a cup is preferably used as a holder for the initial material instead of a filament.

In conclusion, it is to be noted that the invention is, of course, not limited to the composition of the electrode materials specified in the example. Thus, satisfactory results were also obtained with electrode materials in which the indium was replaced by gallium or aluminum, and the gold was replaced by silver. The invention also provides good ohmic electrodes for n-type chalcogenides other than CdS, such as for example, for CdSe or SdTe, or for chalcogenides of other bivalent metals, such as zinc and mercury. For providing the electrodes, use may alternatively be made of other methods suitable for the relevant elements, such as, for example, electrolytic deposition, cathode atomisation, etc. Although the invention is of particular interest for use in photo-conductive devices, in which the electric field strength is often high, it is also applicable to other semiconductor devices with an n-type chalcogenide of a bivalent metal in which a low-ohmic electrode is also advantageous.

What is claimed is:

1. A semi-conductor device comprising a body of a semi-conductive chalcogenide, and a contact to said body, said contact comprising a first element selected from the group consisting of gold, silver, and alloys thereof activated by at least one second element selected from the group consisting of indium, gallium, and aluminum, said second element being present in an amount less than 30 atomic percent.

2. A device as set forth in claim 1, wehrein the second element is present in an amount between 1 and 15 atomic percent.

3. A semi-conductor device comprising a body of a photo-conductive chalcogenide of a bivalent metal having a portion of n-type conductivity, and an ohmic contact to said n-type portion, said contact comprising an element selected from the group consisting of gold, silver and alloys thereof activated by between 1 and 15 atomic percent of at least one element selected from the group consisting of indium, gallium and aluminum.

4. A device as set forth in claim 3, wherein the contact is indium-activated gold, and the body is cadmium sulphide.

5. A semi-conductor device comprising a body of a photo-conductive chalcogenide of a bivalent metal having a portion of n-type conductivity, and an ohmic contact to said n-type portion, said contact comprising a first layer adjoining the body of an element selected from the group consisting of indium, gallium and aluminum, and a second layer on the first layer of an element selected from the group consisting of gold, silver and alloys thereof, said latter element predominating in the ohmic contact.

6. A device as set forth in claim 5 wherein the first layer is indium, the second layer is gold, and the body is cadmium sulphide.

7. A semi-conductor device comprising a body of n-type cadimum sulphide and an ohmic contact to said body, said ohmic contact comprising on the body a first vapor-deposited layer of indium, and on the first layer a second layer of vapor-deposited gold and alloyed with the first layer at their common interface, the quantity of gold present exceeding the quantity of indium present.

8. A method of making an ohmic contact to an n-type portion of a photoconductive chalcogenide of a bivalent metal, comprising providing a clad wire of which the core comprises an element selected from the group consisting of gold, silver and alloys thereof, and the cladding comprises an element selected from the group consisting of indium, gallium and aluminum, and heating said member to evaporate material therefrom onto the said n-type portion to form superposed layers of the cladding element and the core element, said heating being continued until the quantity of the core element in its layer exceeds that of the cladding element in its layer.

9. A method as set forth in claim 8 wherein the wire is indium-clad gold.

10. A semiconductor device comprising a body of a semiconductive chalcogenide of a bivalent metal having a portion of n-type conductivity, and an ohmic contact to said n-type portion, said contact comprising an alloy of two elements in major and minor amounts, the major element being selected from the group consisting of gold, silver, and alloys thereof, the minor element being selected from the group consisting of indium, gallium and aluminum.

References Cited by the Examiner

UNITED STATES PATENTS

| | | | |
|---|---|---|---|
| 2,854,611 | 9/1958 | Smith | 317—237 |
| 2,865,793 | 12/1958 | De Nobel | 317—237 X |

FOREIGN PATENTS

| | | |
|---|---|---|
| 1,077,499 | 3/1960 | Germany. |

JOHN W. HUCKERT, *Primary Examiner.*

JAMES D. KALLAM, *Examiner.*